United States Patent

DuBois et al.

[11] 4,064,167
[45] Dec. 20, 1977

[54] DIHYDROCHALCONE OLIGOMERS

[75] Inventors: Grant E. DuBois and Guy A. Crosby, both of Palo Alto, Calif.

[73] Assignee: Dynapol, Palo Alto, Calif.

[22] Filed: Aug. 30, 1976

[21] Appl. No.: 718,719

Related U.S. Application Data

[63] Continuation-in-part of Ser. No. 635,550, Nov. 26, 1975, abandoned.

[52] U.S. Cl. .................. 260/511; 260/345.2; 426/548
[51] Int. Cl.² ...................... C07C 143/24; A23L 1/22
[58] Field of Search .............. 260/511, 520C; 426/548

[56] References Cited

U. S. PATENT DOCUMENTS

| 3,974,299 | 8/1976 | Crosby et al. | 260/511 |
| 3,956,375 | 5/1976 | Farkas et al. | 260/520 C |
| 3,890,296 | 6/1975 | Horowitz et al. | 426/548 |

OTHER PUBLICATIONS

Primary Examiner—Nicky Chan
Attorney, Agent or Firm—William H. Benz

[57] ABSTRACT

Dihydrochalcone oligomers are disclosed having the general structural formula

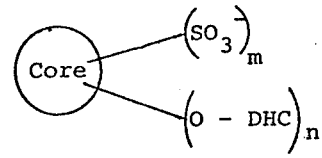

wherein $m$ is an integer from 1 to 6 inclusive, $n$ is an integer from 2 to 6 inclusive, $n$ and $m$ being selected such that the ratio $n/m$ shall have a value of not greater than 2, DHC is a dihydrochalcone group and Core is a toxicologically acceptable organic group which is stable under the conditions of food processing and under the conditions of the digestive tract and to which are covalently bonded the $mSO_3^-$ groups and the $n$O—DHC groups. The subject materials are water-soluble and useful as nonnutritive sweeteners. In such use they offer the advantage of substantial nonabsorption from the gastrointestinal tract into the body.

18 Claims, No Drawings

DIHYDROCHALCONE OLIGOMERS

This is a continuation-in-part of copending U.S. Patent application Ser. No. 635,550, filed Nov. 26, 1975 and now abandoned.

BACKGROUND OF THE INVENTION

Field of the Invention

This invention relates to oligomeric dihydrochalcone compounds. These compounds are useful as non-nutritive sweeteners in food systems, especially aqueous food systems.

The Prior Art

Alejandro Zaffaroni's commonly assigned U.S. Patent 3,876,816 discloses the broad concept that a sweet chemical moiety may be formed into a macromolecule which is too large to be absorbable from the gastrointential tract into the systemic circulation and which thus poses a substantially reduced risk of systemic toxicity. The present invention is a particular species of that invention.

The present invention employs dihydrochalcone moieties. Dihydrochalcones as a class of chemical compounds have been known at least since the 1940's. In 1963 (April 30) in U.S. Patent 3,087,821 R. M. Horowitz et al. disclosed that certain saccharide (glucosyl and neohesperidosyl)-substituted dihydrochalcones are sweet. The Horowitz materials have a structure as follows:

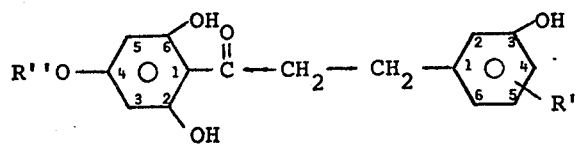

wherein R" is the saccharide residue and R' is H, OH, or OCH$_3$. On June 12, 1973, Rizzi's U.S. Patent 3,739,064 issued disclosing that dihydrochalcones of the formula

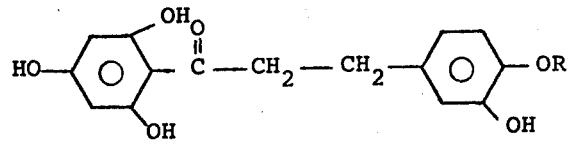

(R equals a 1 to 4 carbon alkyl) are sweet. Also in 1973, a Hungarian patent application was published as Serial Number 2251/CI-1196, disclosing the finding of Farkus et al. that certain carboxyl-substituted dihydrochalcones are sweet as well. Additional prior art describing dihydrochalcones as sweeteners is summarized in the book of Roger Daniels, *Sugar Substitutes and Enhancers*, Noyes Data Corporation, Ridge Park, New Jersey (1973).

The present invention differs from the Zaffaroni prior art in that it deals with certain specific classes of oligomeric dihydrochalcones not disclosed by that reference. It differs from the above-noted body of art on dihydrochalcones as sweeteners in that it deals with dihydrochalcone oligomers, that is, molecules containing 2 or more dihydrochalcone moieties while this previous dihydrochalcone art deals solely with monomeric materials.

STATEMENT OF THE INVENTION

We have now discovered a new class of dihydrochalcone compounds which we have named oligomeric dihydrochalcones. As the term "oligomeric" implies, these new materials contain a limited plurality of dihydrochalcone groups chemically joined together. More specifically, these materials have a structure represented by General Structural Formula I

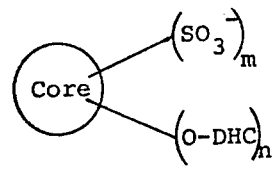

wherein n is an integer from 2 to 6 inclusive and m is an integer from 1 to 6 inclusive, the ratio n/m has a value which is not greater than 2, DHC represents a saccharide-free dihydrochalcone moiety and Core is a toxicologically acceptable organic group. Core has the properties of being stable and not undergoing breakdown or scision under the normal conditions of food processing and under the conditions present in the gastrointestinal tract. The DHC groups are covalently joined to the Core through ether links as shown in Formula I. The SO$_3^-$ groups are covalently attached to the Core as well. The sulfonate groups (SO$_3^-$) in the oligomeric dihydrochalcone molecule are present as alkali or alkaline earth metal salts. Although not shown in Formula I, the cations which also are present are pharmacologically acceptable cations of metals of Groups IA or IIA of the Periodic Table, such as Na$^+$, K$^+$, Mg$^{++}$, or Ca$^{++}$.

DETAILED DESCRIPTION OF THE INVENTION

The dihydrochalcone oligomers of this invention comprise a limited plurality of dihydrochalcone groups and sulfonate groups covalently attached to a molecular core.

The dihydrochalcone groups are saccharide moiety free. They are represented in General Formula I by the shorthand expression DHC. The dihydrochalcone groups have the structure

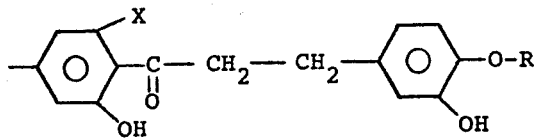

wherein X is hydrogen or hydroxyl and R is a lower alkyl of from 1 to 3 carbons inclusive, i.e., methyl, ethyl, propyl or isopropyl. Preferable X is hydroxyl. Methyl is the preferred R group. Two or more different dihydrochalcones may be present in one oligomer of this invention, if desired. The number n of dihydrochalcone groups present in one oligomer is from 2 to 6 and preferably 2 to 4.

The sulfonate groups are —SO$_3^-$ groups. They are covalently bonded to the central molecular core through a core carbon to sulfur covalent bond. The sulfonate groups are present as salts, having, in ionic association, pharmacologically acceptable cations of metals of Groups IA and IIA of the Periodic Table. Na$^+$, K$^+$, Ca$^{++}$ and Mg$^{++}$ are exemplary cations with Na$^+$, K$^+$ and Ca$^{++}$ being preferred. The number m of sulfonate groups per oligomer is 1 to 6, preferably 1 to 4.

The molecular core, denominated Core in General Formula I, is an organic group. The core and its bonds to the dihydrochalcones and sulfonates should be stable under the conditions of use, i.e., the conditions of food processing and storage and the conditions of the gastrointestinal tract. This stability is desired since it is contempleted that the oligomer will remain essentially intact, save for likely loss or exchange of its associated cations, during use.

It is generally preferred that the molecular core in its finally incorporated form be essentially hydrocarbon or oxyhydrocarbon. The molecular core should be large enough to provide attachment sites for the $n$ dihydrochalcone groups and $m$ sulfonate groups.

The size of the molecular core should be limited. If the core has more than about 12 carbon atoms for each sulfonate group, the oligomer will not be sufficiently soluble. Preferably, the cores contain from about 3 to about 24 carbon atoms subject to the limitation that, with large cores, such as of from 12 to 24 carbons, more than one sulfonate group must be present. Oxyhydrocarbon cores may contain up to about 6 oxygen atoms, preferably present as hydroxyl or ether groups.

The molecular cores are usually olefinically saturated. They include alkylenes, cycloalkylenes, arylenes and aralkylenes having sites (valences) for attaching the $n+m$ dihydrochalcones and sulfonates. These cores may be present as hydrocarbons or may combine hydroxyl or ether substituents. Preferred hydrocarbon cores include, for example, linear and branched alkylenes such as from 3 to about 12 carbons (preferably 3 to 7 carbons) cycloalkylenes of from 5 to about 9 carbons, arylenes of 6 or 10 carbons, and aralkylenes of from about 8 to about 24 carbons. Preferred oxyhydrocarbon cores include, for example, linear alkylenes of from 3 to about 12 carbons containing from 1 to 6 oxygens as hydroxyl or ether groups, cycloalkylenes of from 5 to about 9 carbons containing from 1 to 6 oxygens as hydroxyl groups and aralkylenes of from 8 to about 24 carbons containing from 1 to 6 oxygens as aliphatic hydroxyls.

It is also generally preferred if the cores and the oligomeric dihydrochalcones which are based upon them are symmetric. Thus, the cores may be chosen from the alkylenes, such as n-propylene, n-butylene, n-pentylene, n-hexylene, 2,3-dimethylbutylene, 2,4-dimethylpentylene, n-heptylene, and the like; the cycloalkylenes, such as cyclopentylene, cyclohexylene, 1,4-dimethylcyclopentylene, 1,3,5-trimethylcyclohexylene and the like; and the arylene and aralkylenes, such as phenylene, methylenebenzene, 1,4-dimethylenebenzene, 1,3,5-trimethylenebenzene, 1,2,4,5-tetrabutylenebenzene and 1,4-diethylenebenzene and the like.

The compounds of the invention may be prepared by covalently bonding the flavanone hesperetin or an equivalent dihydrochalcone or dihydrochalcone precursor to the core molecule prior to or after covalently attaching the sulfonate groups or their precursors. If hesperetin or an equivalent flavanone is employed an additional process—opening and reducing the flavanone to the dihydrochalcone either in one step or in separate opening and reduction steps must be effected. A number of specific preparation schemes are set out in the Examples. Several generally applicable preparation routes and the products they produce are as follows. In reaction scheme 1, a polyol having three or more hydroxyls, some of which are primary and some of which are secondary, is employed as starting material. The increased reactivity of the primary hydroxyls is used to attach flavanones specifically thereto, and thereafter the less reactive secondary hydroxyls are converted to sulfonates. This route may be used to form the dihydrochalcone oligomer,

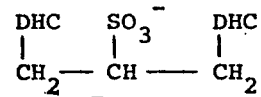

(wherein DHC is a dihydrochalcone) from glycerol as follows:

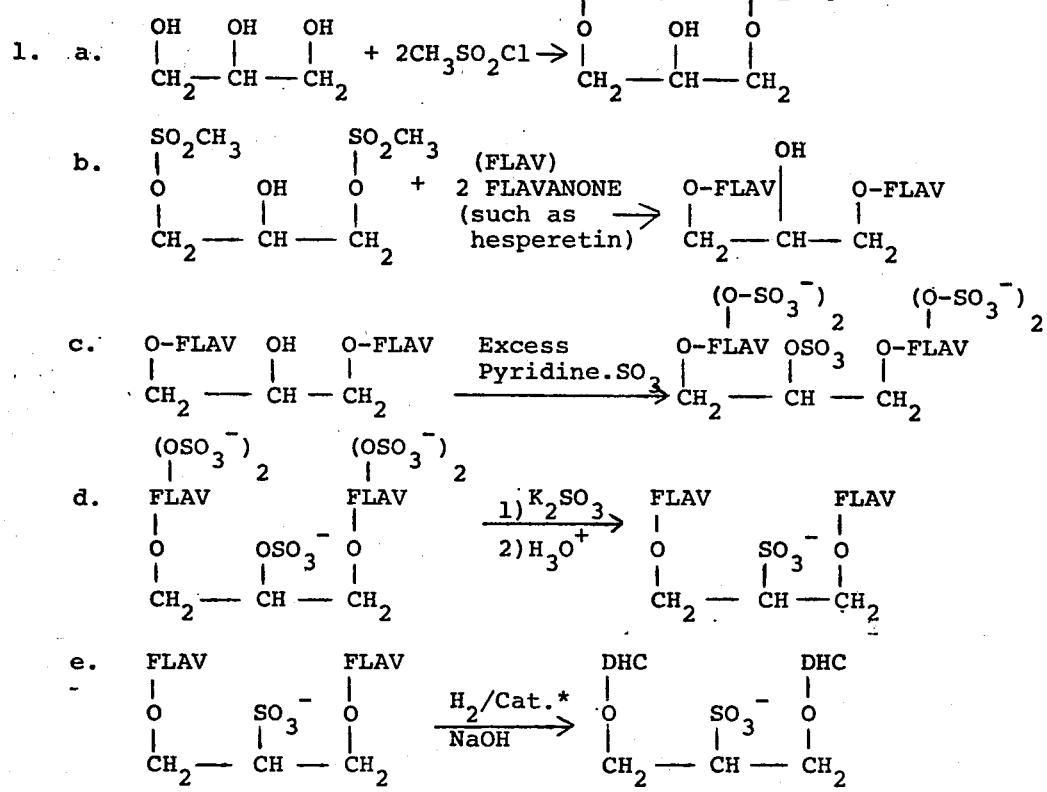

*In many cases, this hydrogenation/ring opening may be arrived at in one step or with separate opening and hydrogenation steps. The hydrogenation catalysts may be Raney nickel or a noble metal or the like.

This same route could be used to effect the following conversions:

This route is more fully shown in Example VIII.

This preparative scheme can be used with other members of the wide range of polyhaloakyls as well.

In a third more specialized scheme a bis-dihydrochalcone oligomer can be prepared from epichlorohydrin.

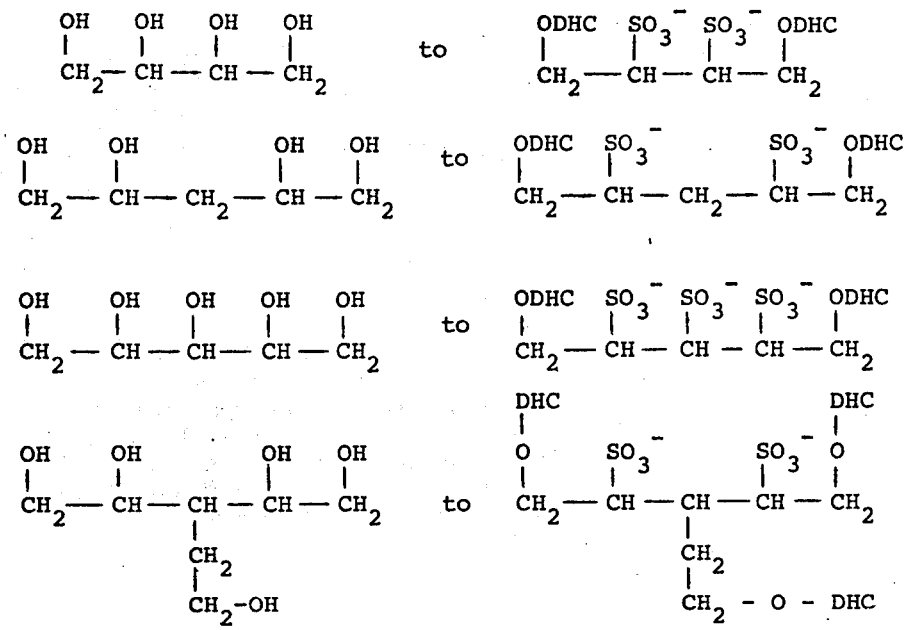

and the like.

In reaction scheme 2 a polyhaloalkane, preferably a polybromoalkane, is employed. This scheme also relies on the enhanced reactivity of primary halogens over secondary halogens to bring about selective reaction. This reaction sequence is exemplified as follows:

Scheme 2 b. (Same as 1. c.)
c. (Same as 1. d.)
d. (Same as 1. e.)

This reaction of epoxides can be further exploited with polyepoxides in reaction scheme 4, for example.

Scheme 4

Scheme 3

3. a. 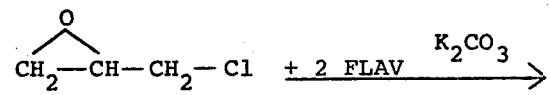 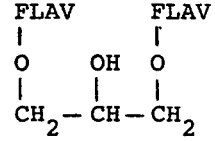

2. a. 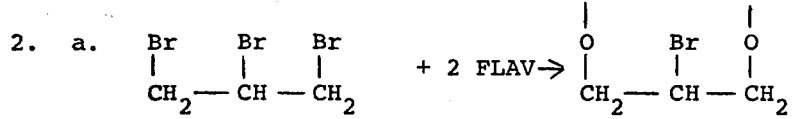

(This reaction will occur with good specificity at the primary carbons.)

b. 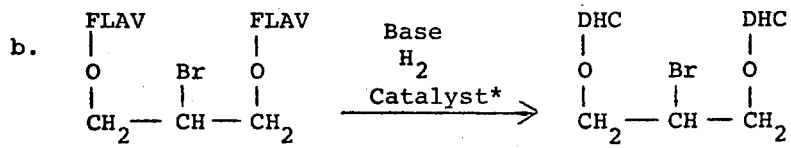

*See 1. e.

c. 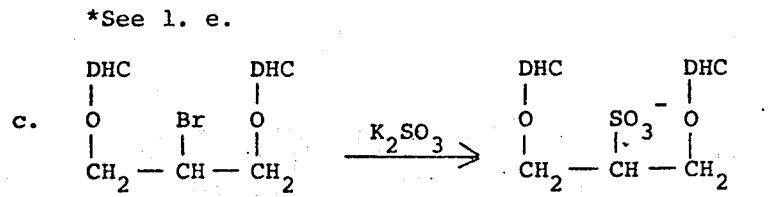

4. a. 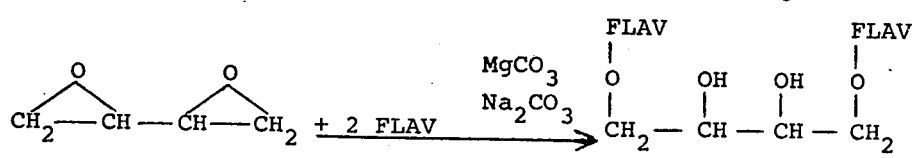

b. (Same as 1. c.)
c. (Same as 1. d.)
d. (Same as 1. e.)

In the same way

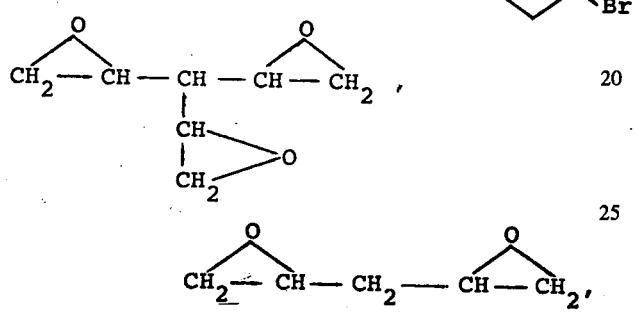

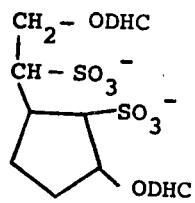

to products such as and the like.

or the like may be converted to the desired dihydrochalcone oligomer products.

A fifth general preparation route to the products of this invention is based on the use of polyols and polyhalo's. It follows the methods set out in routes 1 and 2 with one change. In route 5 the amounts of reactants are closely controlled so that only a controlled portion of the hydroxyl groups or halo groups, irrespective of their primary and secondary character, are reacted to join dihydrochalcones while the remainder are used to attach solubilizers ($SO_3^-$). This route is generally simpler than routes 1 and 2 but is not as structurally specific as these routes.

This route could be used to, for example, convert

A sixth method of preparation is based on the use of olefinically unsaturated polyols and polyhalos and relies on attaching the dihydrochalcones by reaction of the hydroxyls or halides and thereafter adding the sulfonate solubilizers across the double bonds. This method is demonstrated in Example VI and VII and is also represented by the conversion of

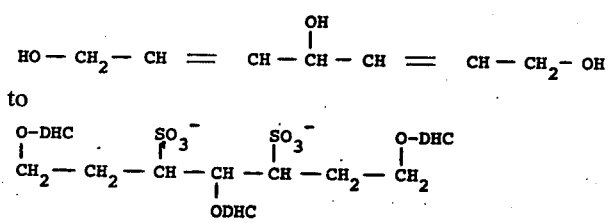

and the like.

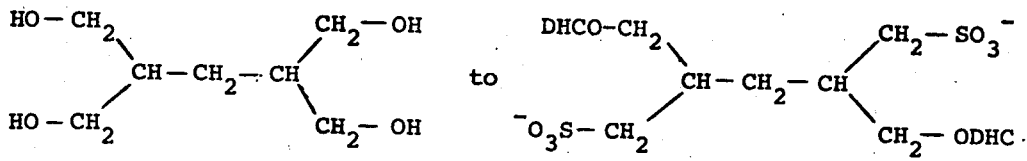

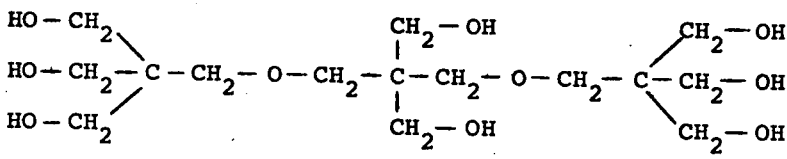

to products such as

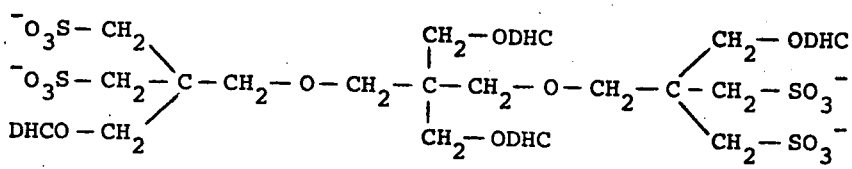

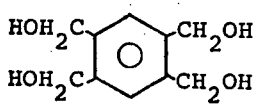 to products such as 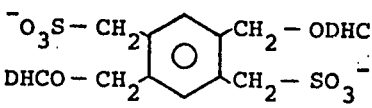

A seventh method starts with or goes through polymeric sultones such as

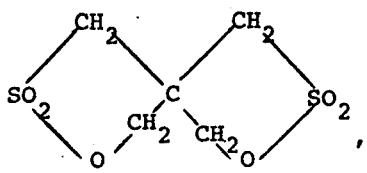, 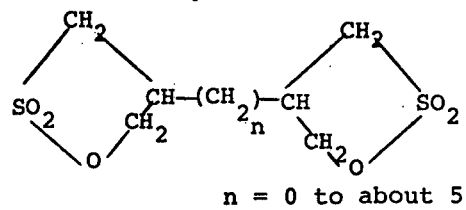

n = 0 to about 5 and

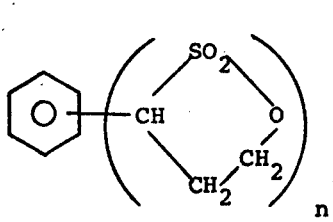

n = 2 to 6

In this method the sultone is reacted with a flavanone as demonstrated in Examples I and II to attach the flavanones and simultaneously generate the required sulfonate groups. This method is carried out under usual alkylation conditions i.e., in an alkylation solvent such as DMF, DMSO, or HMPA in the presence of a weak base such as sodium or potassium carbonate or bicarbonate.

Any of these preparations can be used with other equivalent starting materials, if desired. Also, other techniques for preparing these compounds, which may be apparent to those skilled in the art, may be employed.

The compounds of this invention are useful as sweeteners. In such use, the compounds are admixed with an edible substance in an amount effective to impart a desired degree of sweetness, either alone or in combination with other nonnutritive sweetners such as saccharin or with nutritive "sucrose" sweetners or the like.

Edibles which may be sweetened with the present materials include solid foods such as cereals, cakes, candies, confections and chewing gum; foods such as fruit drinks and ades, colas, beers and wines; and nonfood edibles such as toothpaste, cough drops, cough elixers and tonics. The present compounds are expressly designed to be water-soluble and generally are used in solution. The materials themselves are solids in dry form so can be present as powders in dry bases for gelatin desserts, in premixes for bakings, in powdered drink mixes and the like.

The amount of compound used to sweeten an edible will vary upon the material being sweetened, the degree of sweetness desired, the absolute sweetness of the compound, and the personal tastes of the evaluator. This means that it is not realistic to place close limits on the use levels. In general, use levels of from about 100 p.p.m. to about 4%, basis edible weight, is used.

As noted herein in the background, one advantage of the compounds of this invention is their ability to not be appreciably absorbed from the gastrointestinal tract. It is known that hesperetin and hesperidin dihydrochalcone are metabolized in the gastrointestinal tract of both rats and humans. Similar metabolism of the oligomers reported herein would result in absorption of metabolic products. However, our studies have shown that the dihydrochalcone molecule containing a biologically stable alkyl, aryl or alkaryl group bonded to the $C_4$-oxygen of the dihydrochalcone nucleus is not appreciably metabolized in the gastrointestinal tract. Thus the oligomeric dihydrochalcones of this invention can pass through the gastrointestinal tract intact without absorption. This nonabsorption generally occurs when the compound molecular weight is 700 or greater, and, it is preferred to have molecular weights of from 900 to about 5000.

This invention is further illustrated by the following Examples. These are provided for purposes of illustration are not to be construed as limiting the invention which is instead defined by the appended claims.

EXAMPLE I

This Example discloses a preparation of the oligomeric dihydrochalcone.

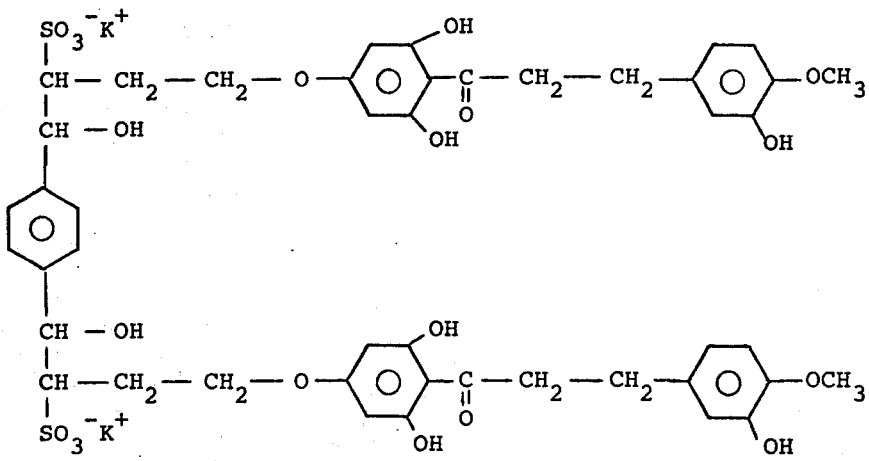

A. Preparation of 1,4-benzdihydryl-3-propane sultone

This procedure is adapted from that of Durst and duManoir. To a solution of 3.66 g. (30.0 mmoles) of freshly distilled propane sultone in 150 ml. of dry DME is added 23.9 ml. of 1.38 M n-butyllithium-hexane solution (33.0 mmoles) dropwise over 45 minutes, while stirring under dry argon in a dry ice-isopropanol bath. After 45 minutes a solution of 1.34 g. (10.0 mmoles) of terephthaldehyde in 10 ml. dry dimethylether is added dropwise over 15 minutes. The reaction mixture is stirred with cooling for 2½ hours, after which it is removed from the cooling bath and allowed to warm to room temperature. It is then poured into a mixture of 200 ml. of brine and 25 ml. of 10% HCl. The layers are separated and the aqueous layer washed with ethyl acetate (2 × 50 ml.). The combined organic extracts are dried over magnesium sulfate and concentrated until material begins to crystallize from solution. Hexane is then added and the resultant mixture is cooled briefly. A total of 1.4 g. of white solid is obtained which thin layer chromatography and NMR indicate is the pure disultone,

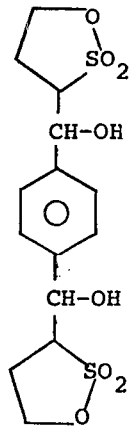

This compound is further characterized by the following IR and NMR spectra:

IR: KBr, 2.93 (O—H), 3.35, 3.41, 6.18, 7.50; max., 8.55, 9.17, 9.70, 11.0.

NMR: TMS, 2.40–4.80 (12H multiplet), 4.98; (2H doublet, J = 5.8H, benzyl H), 7.47(4H singlet).

B. Preparation of benzene-1,4-bis-(1-hydroxy-2-sulfo-4-[2,3′, 6-trihydroxy-4′-methoxy-dihydrochalcone-4-oxy]butane, potassium salt)

Six mls. of DMF is added to a mixture of 452 mg. (1.50 mmoles) of commercial hesperetin, 414 mg. (1.50 mmoles) anhydrous potassium carbonate, and 189 mg. (0.05 mmole) of the 1,4-benzdihydryl-3-propane sultone of Part A. The resultant reaction mixture is flushed with argon and stirred at room temperature. After seven days an aliquot is concentrated under high vacuum and then checked by high pressure liquid chromatography (1 ft. C18 on Bondapak column; 10–50% methanol-water gradient; UV detector—286 nm). Only two peaks are observed. The first has a retention time of 2.4 min. (flavanone dimer) and the second appears after 4.7 minutes and is known to represent hesperetin. Integration indicates the reaction to be 60% complete. The DMF is then removed from the reaction mixture under high vacuum. The residue is dissolved in 10 ml. of water and the resultant solution made acidic (pH 1) by addition of 10% HCl. The aqueous mixture is extracted with ethyl acetate (3 × 25 ml.). The aqueous solution is then concentrated to dryness yielding 61 mg. of a yellow solid which HPLC indicated to be the following pure dimeric flavanone:

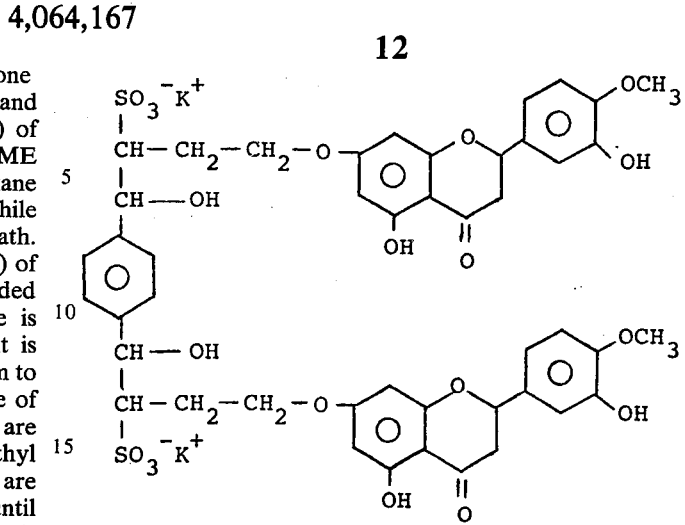

This product is hydrogenated in the presence of base to form the desired dihydrochalcone product. First, the solid is dissolved in 15 ml. of 5% potassium hydroxide after which 120 mg. of 10% Pd-C is added. The reaction mixture is then shaken on a Parr hydrogenator (38 lb. initial $H_2$ pressure) for 16 hours, after which it is filtered through celite and neutralized with 10% HCl. On standing, 38 mg. of tiny white crystals form. The mother liquor contains a large amount of product, as shown by Tlc. The crystalline solid has a melting point of 207–209° C, and the following other properties consistent with the desired oligomeric dihydrochalcone final product:

Neutralization Equivalent: Calculated: 532; Found: 535.

IR: KBr 2.88 (O—H), 3.33, 3.40, 4.93, 6.14; max., (C=O), 6.29, 6.60, 7.00, 8.14, 8.60, 9.10, 9.70, 10.85, 12.15, 13.14.

UV: $H_2O$, 204 ($\xi=30,400$), 219 ($\xi=23,400$); max., 287 ($\xi=17,900$) m. Calculated molecular weight: 998.

C. Properties

An aqueous solution (0.004 molar) of the oligomeric dihydrochalcone prepared in Part B is prepared and tasted. After a short pause, a sweet taste, similar to that of conventional monomeric dihydrochalcones, is noted.

The oligomer of Part B is added to a variety of edibles, including chewing gum, chocolate candy, unflavored gelatin dessert, a cola beverage and lemonade. In each application it increases the apparent sweetness of the edible.

The oligomer of Part B is fed to Simonson mice and is observed to be excreted intact, primarily (95+%) in the feces indicative that the compound is not absorbable into the body.

The oligomer of Part B is placed in boiling water at pH 2.5 and pH 6 for an hour to simulate food processing conditions. Thin layer chromatographic comparison of the solution components before and after heating indicate that the oligomer is stable.

EXAMPLES II AND III

In each of these Examples, the preparation of Example I is repeated with one major change. In Example II, an equivalent molar amount of benzene-1,3,5-tricarboxaldehyde is substituted for the terephthaldehyde employed in Example I. The trisultone, 1,3,5-benztrihydryl-3-propane sultone is formed, reacted with hesperetin to yield the corresponding flavanone trimer and then reduced in the presence of base to benzene-1,3,5-tris (1-hydroxy-2-sulfo-4-(2,3′6-trihydroxy-4′-methoxy-dihydrochalcone-4-oxy) butane, potassium salt), i.e.,

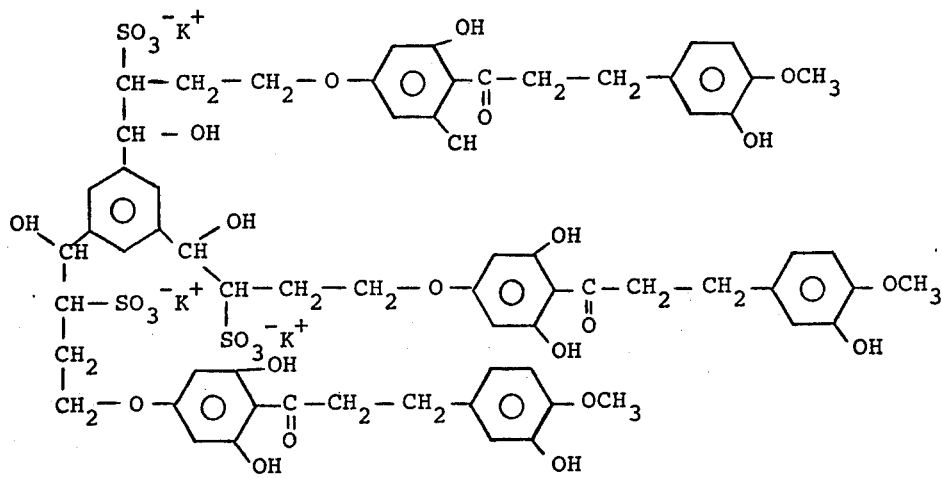

In Example III an equivalent molar amount of benzene-1,2,4,5-tetracarboxaldehyde is substituted for the terephthaldehyde employed in Example I. The tetrasultone, 1,2,4,5-benztetrahydryl-3-propane sultone is formed, reacted with hesperetin to yield the corresponding flavanone tetramer and then reduced in the presence of base to the dihydrochalcone oligomer, benzene-1,2,4,5-tetrakis-9-hydroxy-2-sulfo-4-(2,3′,6-trihydroxy-4′-methoxy-4′-methoxy-dihydrochalcone-4-oxy)butane, potassium salt, i.e.,

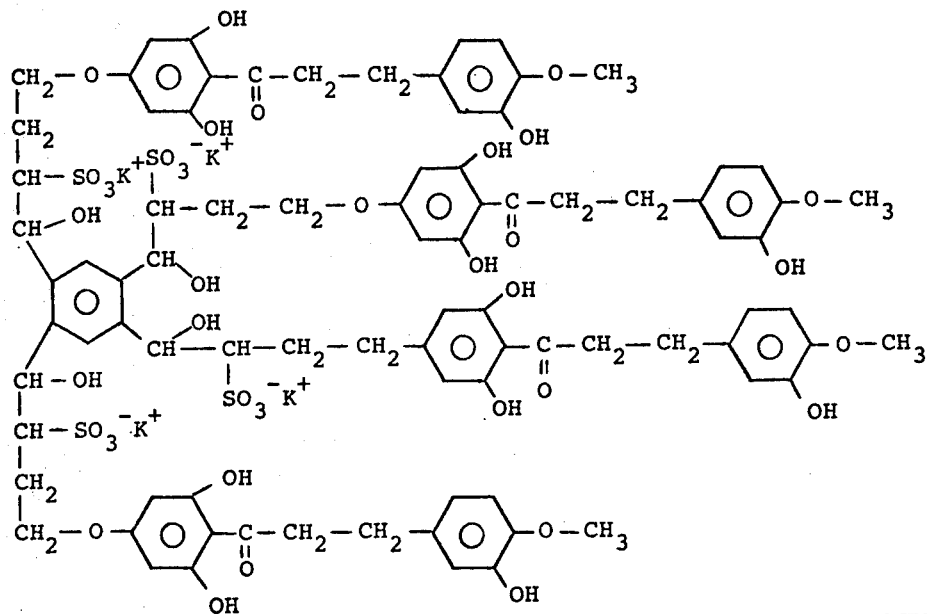

EXAMPLE IV

This Example describes a possible preparation of the Ca$^{II}$ equivalent of material of Example I. The potassium salt of Example I is passed through a column of Amberlite® ion exchange resin (acid form). The disulfonic acid present in the eluent is then combined with one equivalent of CaCl$_2$ and the resultant aqueous solution lyophilized to yield the calcium salt as a white solid.

EXAMPLE V

This Example covers making an ethoxy equivalent of the material in Example I. The preparation of Step A is repeated. Step B is also repeated with one change,

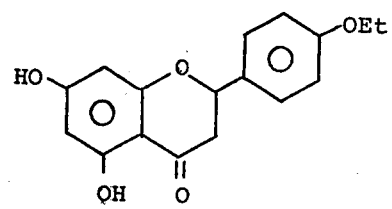

is substituted for hesperetin. The resulting product would be the ethoxy equivalent of the methoxy compounds of Example I.

EXAMPLE VI

This Example deals with a preparation of the oligomeric dihydrochalcone

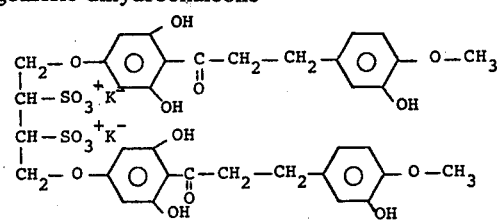

A. Preparation of Dimeric Flavanone

A solution/suspension of commercial 1,4-dibromo-2-butene (Aldrich Chemical Co.) (10 mmol, 2.14 g.), anhydrous potassium carbonate, (25 mmol, 3.46 g.) and hesperetin (20 mmol, 6.04 g.) in 75 ml. of dimethylformamide (DMF) is stirred under argon at 45–50° C. for 15 hours. The mixture is then combined with 500 ml. of water and this combination is extracted trice with 50 ml. portions of ethyl acetate. The extracts are combined, washed with water and brine, dried over MgSO₄ and evaporated to dryness. This crude product is then dissolved in ethyl acetate and this solution is placed on a group of preparative scale Tlc plates and eluted with methylene chloride-methanol. Several bands separate on each Tlc plate including one having no residual bromine and containing a compound having an NMR spectrum consistent with the dimeric flavanone, i.e.,

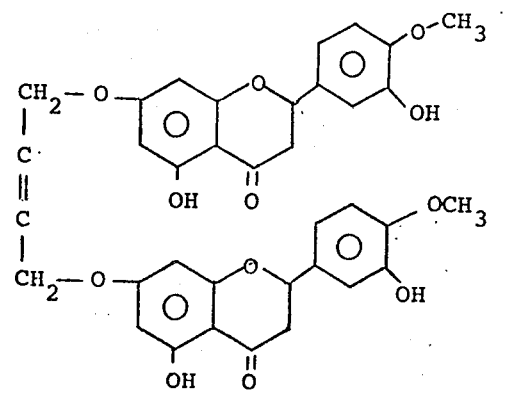

B. Acetylation of Flavanone

The dimeric flavanone of Part A (0.91 mmol, .62 g.) is added to a solution of 1000 ml. of acetic anhydride in 10 ml. dry pyridine and stirred at room temperature for 6 hours. The resulting solution is poured into 100 ml. of water at 0° C. and stirred for ½ hour. A solid forms and is collected by filtration and dried. NMR analysis indicates that this solid is the dimeric flavanone with its four hydroxy groups acetylated.

C. Bromination

The acetylated product (0.8 mmol, 0.63 g.) is dissolved in 10 ml. of methylene chloride and chilled to 0° C. A solution of 10% bromine in methylene chloride is then added dropwise with stirring. Bromine addition is halted when the yellow-orange bromine color just persists. This excess bromine is consumed by adding 15–25 mg. of sodium bisulfite and stirring at room temperature for about 30 minutes. The resulting product is filtered and the filtrate is vacuum stripped on a rotary evaporator. A solid forms which is identified as

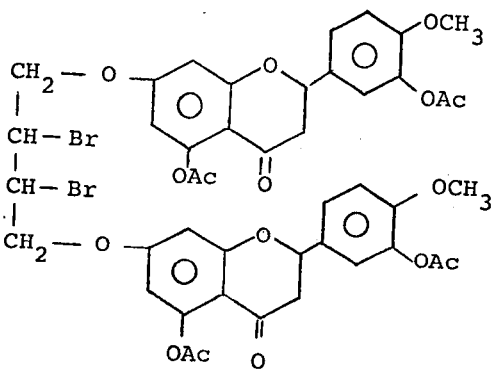

D. Opening

The product of Part C (0.4 mmol, 361 mg.) is added to 10 ml. of 5% aqueous KOH and the mixture is stirred under argon at room temperature for two hours. The reaction mixture is then poured into 50 ml. of water, acidified with HCl and extracted with ethyl acetate (2 × 25 ml.). The combined extracts are washed with NaHCO₃ solution, dried over MgSO₄ and concentrated under vacuum. After isolation with preparative scale Tlc, the following dimeric chalcone is isolated

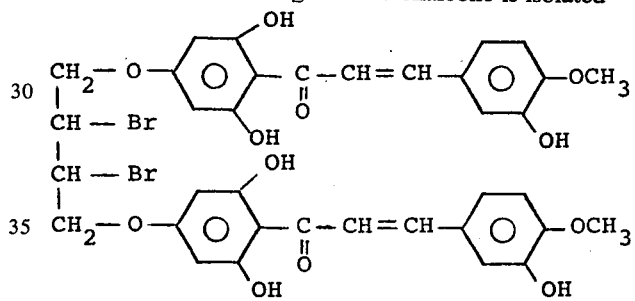

E. Hydrogenation

The product of Part D (0.2 mmol, 172 mg.) is dissolved in 50 ml. of ethyl acetate. One hundred mg. of 10% palladium on carbon is added, the mixture is placed in a Parr hydrogenation apparatus, purged with hydrogen and subjected to an initial hydrogen pressure of 30 p.s.i.g. to convert the dimeric chalcone to the dimeric dihydrochalcone. After one hour, the mixture is filtered and evaporated until all solvent is removed yielding the desired dihydrochalcone.

F. Sulfonation

The product of Part E (0.1 mmol, 87 mg.) is placed in 5 ml. of methanol. Five ml. of water containing 0.30 mmol of K₂SO₃ is added and the mixture is refluxed overnight, filtered and evaporated to dryness. This product is examined by Tlc. The primary component is isolated and found to have properties consistent with the desired dihydrochalcone sulfonate dimer.

EXAMPLE VII

This Example describes a preparation of the oligomeric dihydrochalcone

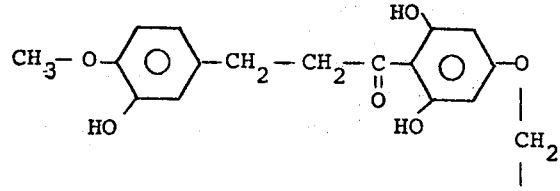
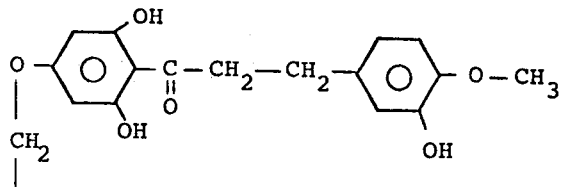

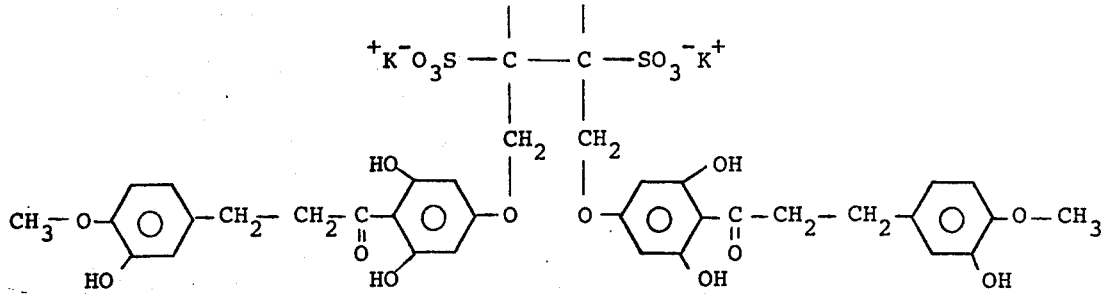

A. Forming Tetrameric Flavanone

A suspension/solution of commercial 2,3-bis-(bromomethyl)-1,4-dibromo-2-butene (Aldrich Chemical Co.) (10 mmol, 4 g.), anhydrous potassium carbonate (45 mmol, 6.2 g.) and hesperetin (40 mmol, 12.1 g.) in 150 ml. of DMF is stirred under argon for 20 hours at 45-50° C. The mixture is then added to a liter of water and this combination is extracted thrice with 100 ml. portions of ethyl acetate. The extracts are combined, washed with water and brine, dried over MgSO₄ and evaporated to dryness. This crude product is then dissolved in ethylacetate and the solution is placed on a group of preparative scale Tlc plates and eluted with methylenechloride-methanol. The Tlc band having a NMR spectrum consistant with the tetrameric flavanone, i.e.,

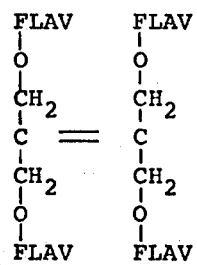

is isolated

B. Acetylation

The tetrameric flavanone of Part A (1 mmol, 1.2 g.) is added to a solution of 1.00 ml. of acetic anhydride in 10 ml. dry pyridine and stirred at room temperature for 6 hours. The resulting solution is poured into 100 ml. of water at 0° C. and stirred for ½ hour. A solid forms and is collected by filtration and is dried. This is the tetrameric flavanone with its 8 hydroxy groups acetylated.

C. Bromination

The acetylated product of Step B (0.8 mmol, 1 g.) is dissolved in 25 ml of methylene chloride and chilled to 0° C. A 10% solution of bromine in methylene chloride is added dropwise with stirring until a faint bromine color persists. This excess bromine is consumed by adding 15-25 mg. of sodium bisulfite and stirring at room temperature for about 30 minutes. The resulting solution is filtered and the filtrate is concentrated to yield the expected 2,3-dibromobutane derivative as a white solid.

D. Opening

The product of Part C (0.4 mmol) is added to 20 ml. of 5% aqueous KOH. This mixture is stirred under argon at room temperature for two hours, diluted with water, acidified and then extracted twice with ethyl acetate. The extracts are washed with NaHCO₃ solution, dried and concentrated under vacuum. This product is purified with preparative scale Tlc to isolate the desired tetrameric chalcone in nonacetylated form.

E. Hydrogenation

The tetrameric chalcone of Part D is then hydrogenated to the tetrameric dihydrochalcone. The chalcone is dissolved in ethyl acetate and placed with 10% palladium on charcoal catalyst in a Parr hydrogenator, and there maintained under hydrogen for an hour at an initial pressure of about 30 p.s.i.g. The mixture is then filtered to remove the catalyst and the filtrate stripped of solvent to yield the tetradihydrochalcone.

F. Sulfonation

The product of Part E, which has two bromo groups, is then rendered water-soluble by converting the bromides to sulfonate salts. This is accomplished by placing the dibromide in methanol, adding a 2-3 fold excess over stoichiometry of aqueous potassium or sodium sulfite, and refluxing the mixture for about 15 hours. The reaction mixture is filtered and evaporated and yields a solid product having as a major component the desired tetrameric dihydrochalcone disulfonate.

EXAMPLE VIII

This Example deals with a preparation of the oligomeric dihydrochalcone

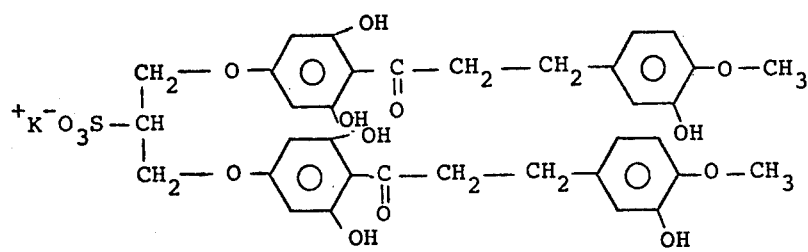

A. Forming Dimeric Flavanone

Commercial (Aldrich Chemical Co.) 1,2,3-tri-bromopropane (10 mmol, 2.8 g.), anhy potassium carbonate (25 mmol) and hesperetin (20 mmol) are suspended/dissolved in about 75 ml. of DMF and the mixture is stirred under argon at about 50° C. for 15 hours. The mixture is then worked up by addition to water, acidification and three extractions with ethyl acetate. The three extracts are combined, washed with water and brine, dried and evaporated to yield a crude product. This product would contain mono, di- and tri-flavanone as well as unreacted hesperetin and tribromopropane. These materials are separated from one another using preparative scale Tlc. The diflavanone is isolated. This is the predominant product and has primarily a 1,3-bis-flavanone structure since the 1 and 3-bromo substituents are substantially more reactive than the 2-bromo.

B. Opening and Hydrogenating

The bis-flavanone of Part A (1 mmol) is dissolved in 10 ml. of 5% aqueous potassium hydroxide after which 200 mg. of 5% aqueous potassium hydroxide after which 200 mg. of freshly prepared Raney nickel is added and the mixture is placed under 50 p.s.i.g. of hydrogen and agitated for 24 hours. The mixture is then filtered and brought to pH 7 with hydrochloric acid. Water is vacuum stripped from the mixture leaving as a product the mono bromo bis-dihydrochalcone.

C. Sulfonation

The bis-dihydrochalcone of Step B is then rendered water-soluble by converting the residual bromo group to a sulfonate. This is accomplished by placing the bromo compound in methanol, adding a 2-3 fold excess over stoichiometry of aqueous potassium sulfite and refluxing the mixture for about 15 hours. The reaction mixture is filtered and evaporated and yield as a solid the desired oligomeric product.

What is claimed is:

1. A salt, selected from the sodium, potassium, calcium and magnesium salts of a dihydrochalcone oligomer having a structure represented by the formula:

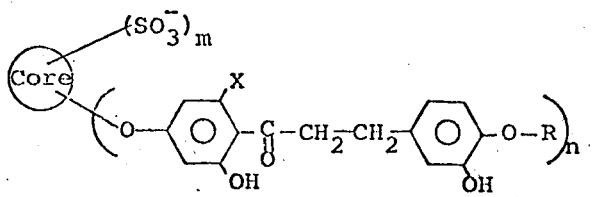

wherein Core is a toxicologically acceptable organic group having n + m valences selected from the hydrocarbons which consist of alkylenes of from 3 to about 12 carbons, cycloalkylenes of from 5 to about 9 carbons, arylenes of 6 or 10 carbons and aralkylenes of from 8 to about 24 carbons; and the oxyhydrocarbons which consist of linear alkylenes of from 3 to 12 carbons containing from 1 to 6 oxygens as hydroxyl groups, linear alkylenes of from 3 to 12 carbons containing 1 to 6 oxygens as ether groups, cycloalkylenes of from 5 to 9 carbons containing from 1 to 6 oxygens as hydroxyl groups, and aralkylenes of from 8 to 24 carbons containing from 1 to 6 oxygens as aliphatic hydroxyl groups; and wherein X is hydrogen or hydroxyl, R is a lower alkyl of from 1 to 3 carbon atoms inclusive, m is an integer of from 1 to 6 inclusive, n is an integer of from 2 to 6 inclusive and the ratio n/m has a value not greater than 2.0.

2. The salt of a dihydrochalcone oligomer of claim 1 wherein X is hydroxyl.

3. The salt of a dihydrochalcone oligomer of claim 1 wherein Core contains not more than 12 carbons for each —SO₃⁻ group.

4. A salt, selected from the sodium, potassium, calcium and magnesium salts of a dihydrochalcone oligomer having a structure represented by the formula:

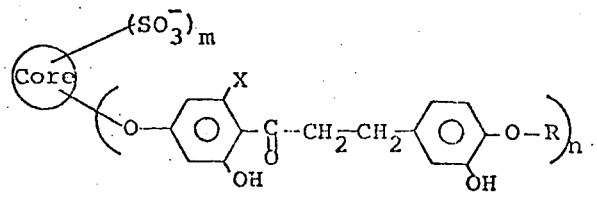

wherein Core is a toxicologically acceptable organic group, selected from the hydrocarbons which consist of alkylenes of from 3 to about 12 carbons, and wherein X is hydrogen or hydroxyl, R is a lower alkyl of from 1 to 3 carbon atoms inclusive, m is an integer of from 1 to 6 inclusive, n is an integer of from 2 to 6 inclusive and the ratio n/m has a value not greater than 2.0.

5. The salt of a dihydrochalcone oligomer of claim 4 wherein X is hydroxyl.

6. The salt of a dihydrochalcone oligomer of claim 5 wherein n has a value of from 2 to 4 and m has a value of from 1 to 4.

7. The salt of a dihydrochalcone oligomer of claim 6 wherein R is methyl.

8. The salt of a dihydrochalcone oligomer of claim 7 wherein the Core is an alkylene of from 3 to about 7 carbon atoms.

9. The salt of a dihydrochalcone oligomer of claim 6 wherein said oligomer has the structure

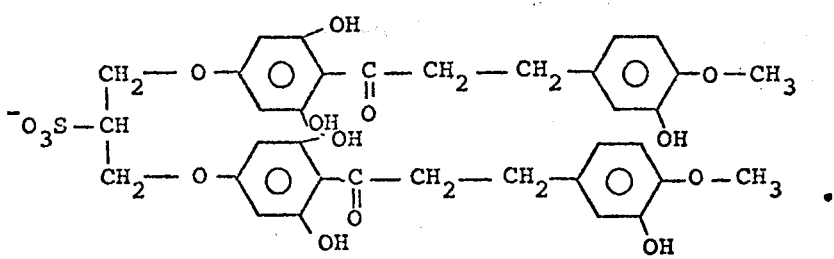

10. The salt of a dihydrochalcone oligomer of claim 6 wherein said oligomer has the structure

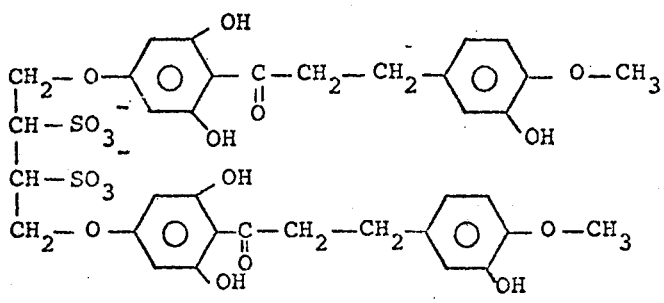

11. The salt of a dihydrochalcone oligomer of claim 6 wherein said oligomer has the structure

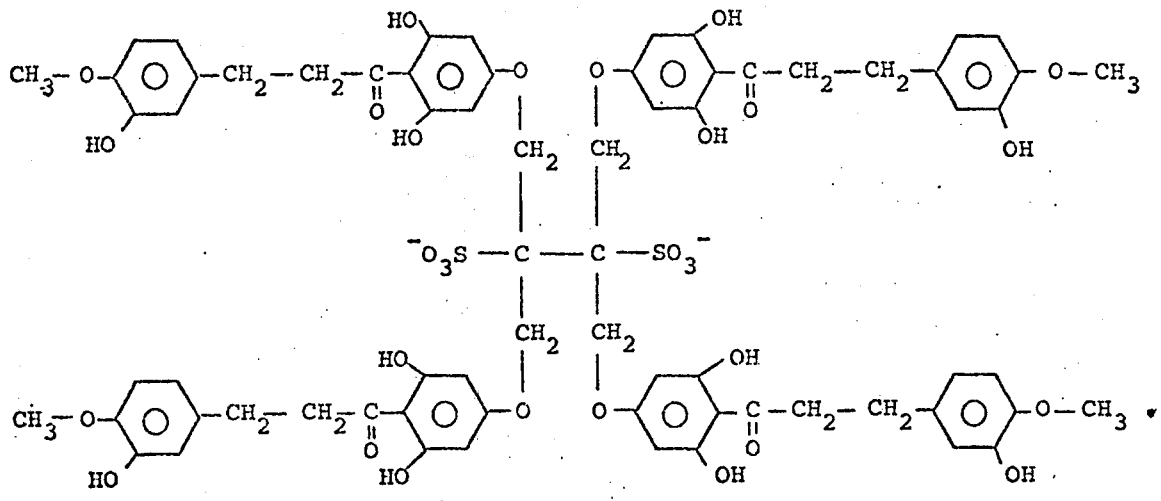

12. A salt, selected from the sodium, potassium, calcium and magnesium salts of a dihydrochalcone oligomer having a structure represented by the formula:

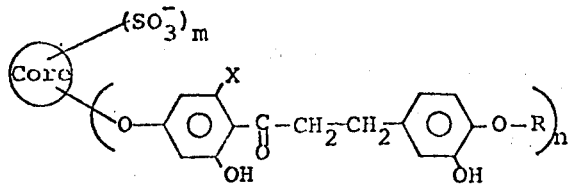

wherein Core is a toxicologically acceptable organic group, selected from the aralkylenes of from 8 to 24 carbons containing from 1 to 6 oxygens as aliphatic hydroxyl groups; and wherein X is hydrogen or hydroxyl, R is a lower alkyl of from 1 to 3 carbon atoms inclusive, $m$ is an integer of from 1 to 6 inclusive, $n$ is an integer of from 2 to 6 inclusive and the ration $n/m$ has a value not greater than 2.0.

13. The salt of a dihydrochalcone oligomer of claim 12 wherein X is hydroxyl.

14. The salt of a dihydrochalcone oligomer of claim 13 wherein $n$ has a value of from 2 to 4 and $m$ has a value of from 1 to 4.

15. The salt of a dihydrochalcone oligomer of claim 14 wherein said oligomer has the structure

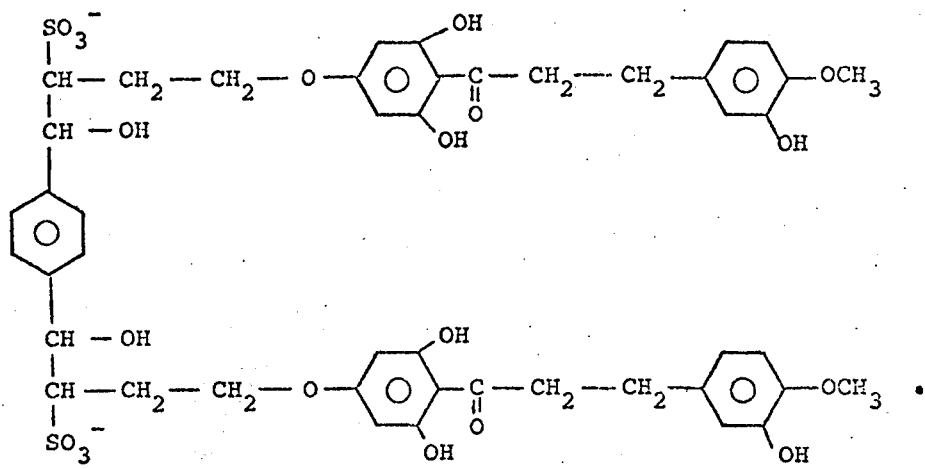

16. The salt of a dihydrochalcone oligomer of claim 14 wherein said oligomer has the structure
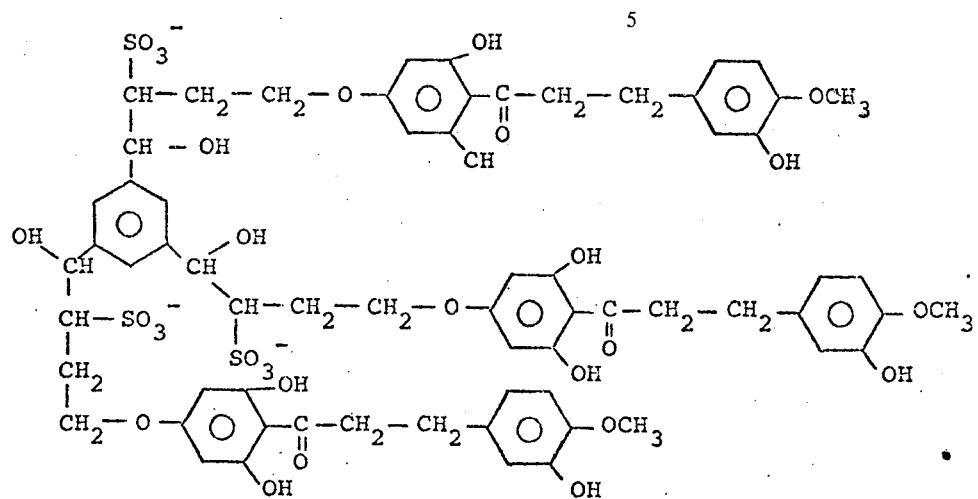
17. The salt of a dihydrochalcone oligomer of claim 14 wherein said oligomer has the structure
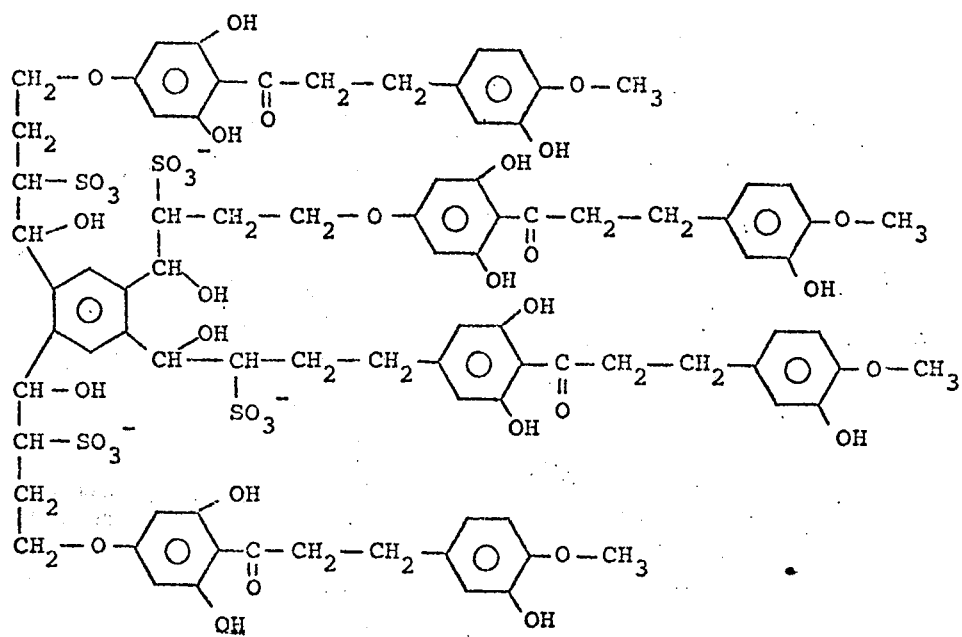
18. The salt of a dihydrochalcone oligomer having the formula:
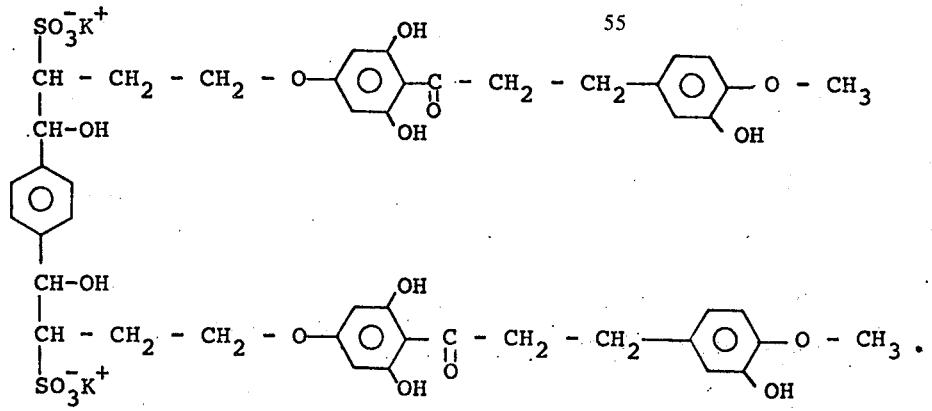
* * * * *